(12) United States Patent
Wu

(10) Patent No.: US 9,763,163 B2
(45) Date of Patent: Sep. 12, 2017

(54) METHOD AND DEVICE FOR SIMULTANEOUS COMMUNICATIONS WITH MULTIPLE BASE STATIONS AND RELATED COMMUNICATION DEVICE

(71) Applicant: HTC Corporation, Taoyuan (TW)

(72) Inventor: Chih-Hsiang Wu, Taoyuan (TW)

(73) Assignee: HTC Corporation, Taoyuan (TW)

( * ) Notice: Subject to any disclaimer, the term of this patent is extended or adjusted under 35 U.S.C. 154(b) by 0 days.

(21) Appl. No.: 15/135,564

(22) Filed: Apr. 22, 2016

(65) Prior Publication Data

US 2016/0242096 A1 Aug. 18, 2016

Related U.S. Application Data

(62) Division of application No. 14/187,325, filed on Feb. 24, 2014, now Pat. No. 9,357,438.

(Continued)

(51) Int. Cl.
*H04W 36/00* (2009.01)
*H04W 36/38* (2009.01)
(Continued)

(52) U.S. Cl.
CPC ........... *H04W 36/38* (2013.01); *H04W 12/04* (2013.01); *H04W 36/0005* (2013.01);
(Continued)

(58) Field of Classification Search
CPC . H04W 36/38; H04W 36/0005; H04W 12/04; H04W 76/025; H04W 84/045; H04L 2463/061; H04L 63/205
(Continued)

(56) References Cited

U.S. PATENT DOCUMENTS 8,295,165 B2 10/2012 Jung
8,948,768 B2 2/2015 Bienas
(Continued)

FOREIGN PATENT DOCUMENTS

CN 102595639 A 7/2012
EP 2448325 A1 5/2012
(Continued)

OTHER PUBLICATIONS

Office Action dated Nov. 1, 2016 for the Japanese Application No. 2015-231092, filed Nov. 26, 2015, pp. 1-3.
(Continued)

*Primary Examiner* — Wayne Cai
(74) *Attorney, Agent, or Firm* — Winston Hsu

(57) ABSTRACT

A first base station for handling cell release for dual connectivity in a communication system comprising a user equipment (UE) connecting to the first base station and a second base station, the first base station comprises a processing means configured to execute the instructions of determining to release a cell of the second base station which communicates with the UE; transmitting a cell release request message to the second base station, for initiating a release of the cell of the second base station from the UE; receiving a cell release response message transmitted by the second base station in response to the cell release request message; transmitting a RRC message to the UE, to indicate the UE to release the cell of the second base station, after receiving the cell release response message; and receiving a RRC response message transmitted by the UE in response to the RRC message.

5 Claims, 10 Drawing Sheets

Related U.S. Application Data

(60) Provisional application No. 61/768,363, filed on Feb. 22, 2013.

(51) Int. Cl.

| | | |
|---|---|---|
| *H04W 12/04* | (2009.01) | |
| *H04W 76/02* | (2009.01) | |
| *H04W 76/06* | (2009.01) | |
| *H04W 84/04* | (2009.01) | |
| *H04L 29/06* | (2006.01) | |

(52) U.S. Cl.
CPC ....... *H04W 76/025* (2013.01); *H04W 76/064* (2013.01); *H04L 63/205* (2013.01); *H04L 2463/061* (2013.01); *H04W 84/045* (2013.01)

(58) Field of Classification Search
USPC .......................... 455/436–444, 435.1–435.3
See application file for complete search history.

(56) References Cited

U.S. PATENT DOCUMENTS

| | | | |
|---|---|---|---|
| 2004/0213279 | A1 | 10/2004 | Kusaki |
| 2006/0233376 | A1 | 10/2006 | Forsberg |
| 2008/0188200 | A1 | 8/2008 | Forsberg |
| 2010/0054472 | A1 | 3/2010 | Barany |
| 2010/0191971 | A1 | 7/2010 | Bajic |
| 2010/0329211 | A1 | 12/2010 | Ou |
| 2011/0122843 | A1 | 5/2011 | Iwamura |
| 2012/0082084 | A1* | 4/2012 | Balakrishnan .... H04W 72/1215 370/315 |
| 2012/0106510 | A1 | 5/2012 | Kuo |
| 2012/0142354 | A1 | 6/2012 | Ahluwalia |
| 2012/0149419 | A1 | 6/2012 | Roh |
| 2012/0236707 | A1 | 9/2012 | Larsson |
| 2012/0281548 | A1 | 11/2012 | Lin |
| 2013/0039339 | A1 | 2/2013 | Rayavarapu |
| 2013/0053048 | A1 | 2/2013 | Garcia |
| 2013/0244678 | A1 | 9/2013 | Damnjanovic |
| 2013/0316712 | A1* | 11/2013 | Lee ...................... H04W 36/00 455/436 |
| 2014/0092866 | A1 | 4/2014 | Teyeb |
| 2014/0241317 | A1 | 8/2014 | Jamadagni |
| 2014/0286243 | A1 | 9/2014 | Yamada |
| 2014/0307872 | A1 | 10/2014 | Heo |
| 2014/0308921 | A1 | 10/2014 | Zhang |
| 2014/0337935 | A1 | 11/2014 | Liu |
| 2015/0043490 | A1 | 2/2015 | Wu |
| 2015/0043492 | A1 | 2/2015 | Baek |
| 2016/0037405 | A1 | 2/2016 | Choi |

FOREIGN PATENT DOCUMENTS

| | | | |
|---|---|---|---|
| JP | 20143440 | A | 1/2014 |
| JP | 2014158240 | A | 8/2014 |
| JP | 2014527764 | A | 10/2014 |
| TW | I337030 | | 2/2011 |
| TW | I351234 | | 10/2011 |
| TW | I357270 | | 1/2012 |
| WO | 2011100492 | A1 | 8/2011 |
| WO | 2012092736 | A1 | 7/2012 |
| WO | 2012168996 | A1 | 12/2012 |
| WO | 2013024333 | A2 | 2/2013 |
| WO | 2013024333 | A3 | 2/2013 |
| WO | 2013116976 | A1 | 8/2013 |
| WO | 2014109606 | A1 | 7/2014 |
| WO | 2014147929 | A1 | 9/2014 |

OTHER PUBLICATIONS

Notice of Allowance dated May 10, 2016 for the U.S. Appl. No. 14/267,937, filed May 2, 2014, p. 1-27.

ETSI TS 136 300 V11.4.0 (Feb. 2013), LTE; Evolved Universal Terrestrial Radio Access (E-Utra) and Evolved Universal Terrestrial Radio Access Network (E-UTRAN); Overall description; stage2; (3GPP TS 36.300 version 11.4.0 Release 11).

ETSI TS 136 331 V11.1.0 (Nov. 2012), LTE; Evolved Universal Terrestrial Radio Access (E-UTRA); Radio Resource Control (RRC); Protocol specification; (3GPP TS 36.331 version 11.1.0 Release 11).

Huawei et al., "Analysis of inter-node signalling load for mobility mechanism in small cell deployment", 3GPP TSG-RAN WG2 Meeting #81, R2-130228, St. Julian's, Malta, Jan. 28-Feb. 1, 2013.

Notice of Allowance dated Feb. 4, 2016 for the U.S. Appl. No. 14/187,325, filed Feb. 24, 2014, p. 1-14.

3GPP TR 36.932 V12.0.0 (Dec. 2012).

3GPP TS 36.331 V11.2.0 (Dec. 2012).

3GPP TSG-RAN WG2 #81 Tdoc R2-130324, Jan. 2013.

3GPP TSG-RAN WG2 #81 Tdoc R2-130420, Jan. 2013.

European patent application No. 14020017.1, European application filing date: Feb. 24, 2014, European Search Report dated Jul. 2, 2014.

3GPP TS 33.401 V12.6.0 (Dec. 2012), "3rd Generation Partnership Project; Technical Specification Group Services and System Aspects; 3GPP System Architecture Evolution (SAE); Security architecture (Release 12)", XP050691417, pp. 1-121.

3GPP TS 36.300 V11.4.0 (Dec. 2012), "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 11)", XP050691592, pp. 1-208.

3GPP TS 36.423 V11.3.0 (Dec. 2012), "3rd Generation Partnership Project; Technical Specification Group Radio Access Network; Evolved Universal Terrestrial Radio Access Network (E-UTRAN); X2 application protocol (X2AP) (Release 11)", XP050691148, pp. 1-141.

Catt, "Evaluation on the mobility enhancement", 3GPP TSG RAN WG2 Meeting #81, R2-130116, Jan. 28-Feb. 1, 2013, St. Julian's, Malta, XP050668013, pp. 1-3.

Huawei, HiSilicon, "Feasible scenarios and benefits of dual connectivity in small cell deployment", 3GPP TSG-RAN WG2 Meeting #81, R2-130225, Jan. 28-Feb. 1, 2013, St. Julian's, Malta, XP050668294, pp. 1-9.

Samsung, "Preliminary discussion on inter-ENB Carrier Aggregation", 3GPP TSG-RAN WG2 Meeting #81, R2-130099, Jan. 28 to Feb. 1, 2013, St. Julian's, Malta, XP050668002, pp. 1-5.

European patent application No. 14020017.1, European application filing date: Feb. 24, 2014, European Search Report dated Oct. 8, 2014.

Office action dated Oct. 17, 2014 for the European application No. 14020017.1, filing date Feb. 24, 2014, p. 1-20.

NTT Docomo, Inc., "Necessity of C-plane architecture enhancements for dual connectivity", 3GPP TSG-RAN2#81, R2-130488, Jan. 28-Feb. 1, 2013, St. Julian's, Malta, XP050668107, pp. 1-4.

Office Action dated Feb. 3, 2015 for the Japanese Application No. 2014-033382, filing date Feb. 24, 2014, pp. 1-3.

European Search report dated Jul. 2, 2014 for EP application No. 14020057.7, filing date May 2, 2014.

Office action dated Jul. 11, 2014 for the European application No. 14020057.7, filing date May 2, 2014, p. 1-9.

Huawei, HiSilicon, "Analysis of inter-node signalling load for mobility mechanism in small cell deployment", 3GPP TSG-RAN WG2 Meeting #81bis, R2-131260, Apr. 15-19, 2013, Chicago, USA, XP050699466, pp. 1-4.

Samsung, "Discussion on inter-ENB Carrier Aggregation", 3GPP TSG-RAN WG2 Meeting #81bis, R2-131069, Apr. 15-19, 2013, Chicago, US, XP050699237, pp. 1-5.

European Search report dated Jan. 26, 2015 for EP application No. 14180472.4, filing date Aug. 11, 2014.

3GPP TR 37.803 V11.2.0 (Jun. 2013), "3rd Generation Partnership Project; Technical Specification Group Radio Access Network; Universal Mobile Telecommunications System (UMTS) and LTE; Mobility enhancements for Home Node B (HNB) and Home enhanced Node B (HeNB) (Release 11)", XP050711892, pp. 1-116.

(56) References Cited

OTHER PUBLICATIONS

3GPP TS 36.321 V11.3.0 (Jun. 2013), "3rd Generation Partnership Project; Technical Specification Group Radio Access Network; Evolved Universal Terrestrial Radio Access (E-UTRA); Medium Access Control (MAC) protocol specification (Release 11)", XP050712004, pp. 1-57.
Huawei, HiSilicon, "Study of Solutions and Radio Rrotocol Architecture for Dual-Connectivity", 3GPP TSG-RAN WG2 Meeting#81bis, R2-131164, Apr. 15-19, 2013, Chicago, USA, XP050699432, pp. 1-12.
Intel Corporation, "Radio link failure handling for dual connectivity", 3GPP TSG RAN WG2 Meeting#82, R2-131990, May 20-25, 2013, Fukuoka, Japan, XP050700115, pp. 1-4.
Pantech, "Analysis of the RLF in dual connectivity", 3GPP TSG-RAN WG2 Meeting#81bis, R2-131100, Apr. 15-19, 2013, Chicago, USA, XP050699421, pp. 1-5.
Sharp, "PCell vs. SCell with PUCCH for inter-eNB CA", 3GPP TSG-RAN WG2#82, R2-132052, May 20-24, 2013, Fukuoka, Japan, XP050700141, pp. 1-6.
Office action dated Jun. 2, 2015 for the U.S. Appl. No. 14/267,937, filed May 2, 2014, p. 1-27.
Office action dated Sep. 10, 2015 for the European application No. 14180472.4, pp. 1-7.
Office action dated Dec. 10, 2015 for the Taiwan application No. 103127521, filing date Aug. 11, 2014, p. 1-8.
Broadcom Corporation, Mobility for dual connectivity, 3GPP TSG RAN WG2 Meeting#81bis, Chicago, USA, Apr. 15-19, 2013, R2-130990.
Office action dated Feb. 23, 2016 for the U.S. Appl. No. 14/455,952, filed Aug. 11, 2014, p. 1-50.
Office action dated May 2, 2017 for the China application No. 201410404801.4, filing date Aug. 11, 2014, p. 1-11.
Notice of allowance dated Jun. 20, 2017 for the Japanese Application No. 2015-231092, filing date Nov. 26, 2015, pp. 1-3.
3GPP TS 36.300 V11.6.0 (Jun. 2013), "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 11)", XP050712084, pp. 1-209.
3GPP TS 36.331 V11.2.0 (Dec. 2012), "3rd Generation Partnership Project; Technical Specification Group Radio Access Network; Evolved Universal Terrestrial Radio Access (E-UTRA); Radio Resource Control (RRC); Protocol specification (Release 11)", XP050691590, pp. 1-340.
Huawei, HiSilicon, "Study of Solutions and Radio Protocol Architecture for Dual-Connectivity", 3GPP TSG-RAN WG2 Meeting #81 bis, R2-131164, Apr. 15-19, 2013, Chicago, USA, XP050699432, pp. 1-12.
Huawei, HiSilicon, "Analysis of inter-node signalling load for mobility mechanism in small cell deployment", 3GPP TSG-RAN WG2 Meeting #81 bis, R2-131260, Apr. 15-19, 2013, Chicago, USA, XP050699466, pp. 1-4.
3GPP TR 36.842 V12.0.0 (Dec. 2013), "3rd Generation Partnership Project; Technical Specification Group Radio Access Network; Study on Small Cell enhancements for E-UTRA and E-UTRAN; Higher layer aspects (Release 12)", XP050752647, pp. 1-71.
Search Report dated May 16, 2017 for EP application No. 17158263.8, pp. 1-8.

* cited by examiner

METHOD AND DEVICE FOR SIMULTANEOUS COMMUNICATIONS WITH MULTIPLE BASE STATIONS AND RELATED COMMUNICATION DEVICE

CROSS REFERENCE TO RELATED APPLICATIONS

This application is a divisional application of U.S. application Ser. No. 14/187,325, filed on Feb. 24, 2014. In addition, the U.S. application Ser. No. 14/187,325 claims the benefit of U.S. Provisional Application No. 61/768,363, filed on Feb. 22, 2013.

BACKGROUND OF THE INVENTION

1. Field of the Invention

The present invention relates to a method used in a wireless communication system and related communication device, and more particularly, to a method of handling cell addition and release for operation of dual connectivity and related communication device.

2. Description of the Prior Art

A long-term evolution (LTE) system supporting the 3rd Generation Partnership Project (3GPP) Rel-8 standard and/or the 3GPP Rel-9 standard are developed by the 3GPP as a successor of a universal mobile telecommunications system (UMTS), for further enhancing performance of the UMTS to satisfy increasing needs of users. The LTE system includes a new radio interface and a new radio network architecture that provides a high data rate, low latency, packet optimization, and improved system capacity and coverage. In the LTE system, a radio access network known as an evolved universal terrestrial radio access network (E-UTRAN) includes multiple evolved Node-Bs (eNBs) for communicating with multiple user equipments (UEs), and for communicating with a core network including a mobility management entity (MME), a serving gateway, etc., for Non-Access Stratum (NAS) control.

A LTE-advanced (LTE-A) system, as its name implies, is an evolution of the LTE system. The LTE-A system targets faster switching between power states, improves performance at the coverage edge of an eNB, and includes advanced techniques, such as carrier aggregation (CA), coordinated multipoint (CoMP) transmission/reception, UL multiple-input multiple-output (MIMO), etc. For a UE and an eNB to communicate with each other in the LTE-A system, the UE and the eNB must support standards developed for the LTE-A system, such as the 3GPP Rel-10 standard or later versions.

Small cells controlled by low-power base stations (e.g., low power NBs/eNBs) are considered to solve fast-growing mobile traffic. The small cells can be deployed in hot spots for both indoor and outdoor scenarios. A low-power base station generally means a base station with a transmission power lower than that of a macro cell base station (e.g., normal NB/eNB). For example, a pico cell base station and a femto cell base station are usually considered low-power base stations. A UE may simultaneously communicate with a macro cell base station and a low-power base station, i.e. dual connectivity. In this situation, the UE can performs transmissions and/or receptions (e.g., of data, packets, messages and/or control information) via both the macro cell base station and the low-power base station. The dual connectivity provides benefits that the data throughput increases due to simultaneous data transmissions from/to the macro base station. However, it is unknown how to configure a cell of the low-power base station to the UE to enable the dual connectivity, i.e. adding a cell of the low-power base station while the UE has connected to the macro cell base station, which may have security concerns. In addition, it is also unknown how to release a cell of the low-power base station configured to the UE for the dual connectivity for the UE.

Thus, how to add a cell to enable the dual connectivity and release a cell in the dual connectivity and satisfy the security requirement are important problems to be solved.

SUMMARY OF THE INVENTION

The present invention therefore provides a method and related communication device for handling addition and release of a cell of a base station for a communication device to solve the abovementioned problem.

A first base station for handling cell release for dual connectivity in a communication system comprising a user equipment (UE), the first base station and a second base station, wherein the UE has been connected to the first base station and the second base station, the first base station comprises a storage unit for storing instructions and a processing means coupled to the storage unit. The processing means is configured to execute the instructions stored in the storage unit. The instructions comprise determining to release a cell of the second base station which communicates with the UE; transmitting a cell release request message to the second base station, for initiating a release of the cell of the second base station from the UE; receiving a cell release response message transmitted by the second base station in response to the cell release request message; transmitting a RRC message to the UE, to indicate the UE to release the cell of the second base station, after receiving the cell release response message; and receiving a RRC response message transmitted by the UE in response to the RRC message.

A first base station for handling cell release for dual connectivity in a communication system comprising a user equipment (UE), the first base station and a second base station, wherein the UE has been connected to the first base station and the second base station, the first base station comprises a storage unit for storing instructions and a processing means coupled to the storage unit. The processing means is configured to execute the instructions stored in the storage unit. The instructions comprise receiving a cell release request message from the second base station, for initiating a release of a cell of the second base station from the UE; transmitting a RRC message to the UE, to indicate the UE to release the cell of the second base station in response to the cell release request message; receiving a RRC response message transmitted by the UE in response to the RRC message; and transmitting a cell release confirm message to the second base station, after receiving the RRC response message.

A second base station for handling cell release for dual connectivity in a communication system comprising a user equipment (UE), a first base station and the second base station, wherein the UE has been connected to the first base station and the second base station, the second base station comprises a storage unit for storing instructions and a processing means coupled to the storage unit. The processing means is configured to execute the instructions stored in the storage unit. The instructions comprise deciding to release a cell of the second base station from the UE; transmitting a cell release request message to the first base station, for initiating a release of the cell of the second base station from the UE; and receiving a cell release confirm message from the first base station, wherein the first base station transmitting a RRC message to the UE, to indicate the UE to release the cell of the second base station in response to the cell release request message.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
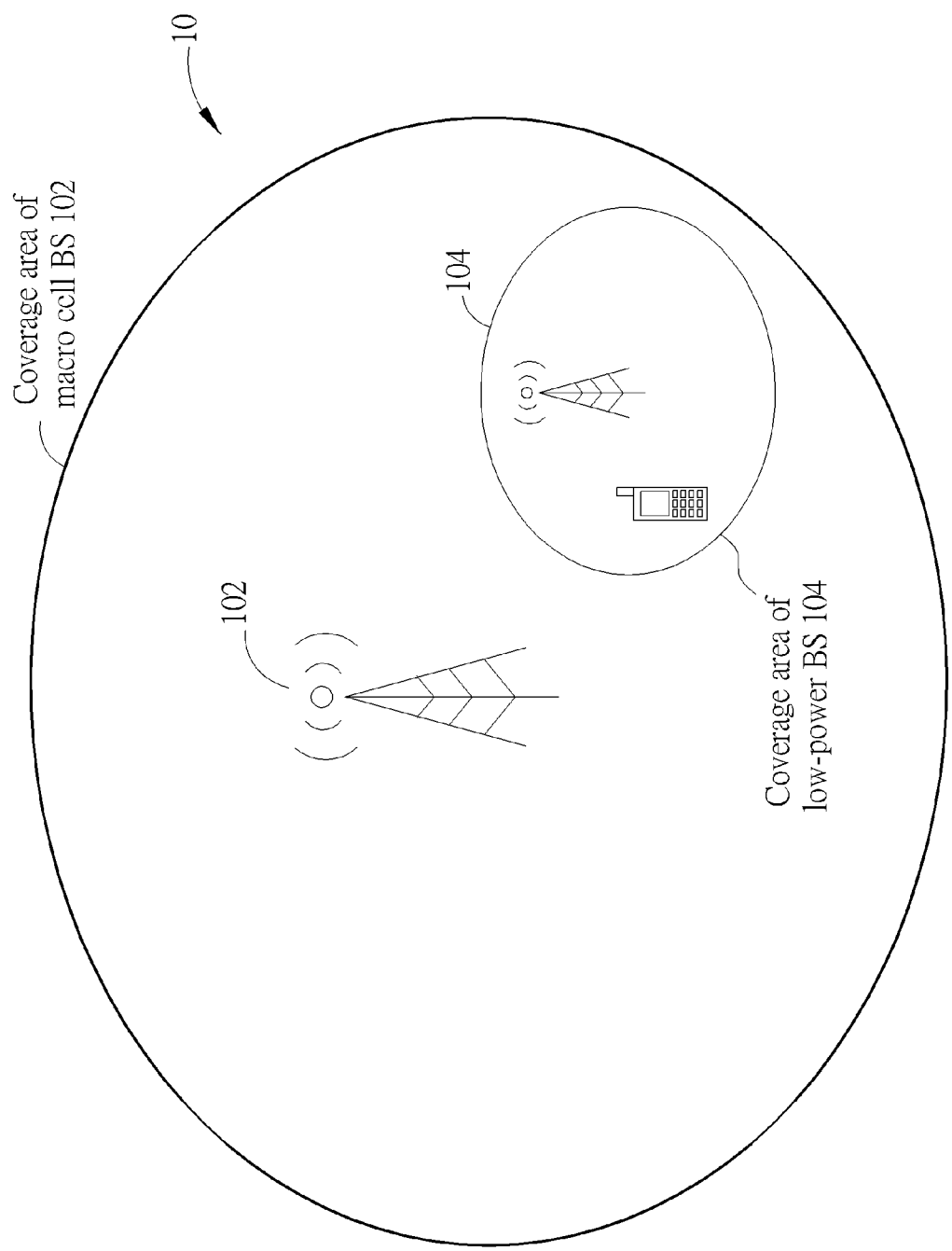
FIG. 1 is a schematic diagram of a wireless communication system according to an example of the present invention.

FIG. 1 is a schematic diagram of a wireless communication system 10 according to an example of the present invention. The wireless communication system 10 is briefly composed of a user equipment (UE) 100, a macro cell base station (BS) 102, a low-power BS 104, and. In FIG. 1, the UE 100, the macro cell BS 102 and the low-power BS 104 and are simply utilized for illustrating the structure of the wireless communication system 10. Practically, the macro cell BS 102 and/or the low-power BS 104 can be a evolved NBs (eNB) and/or a relay station in an evolved UTRAN (E-UTRAN), a long term evolution (LTE) system, a LTE-Advanced (LTE-A) system or an evolution of the LTE-A system. In addition, the low-power BS 104 may be a pico cell BS or a femto cell BS. In FIG. 1, the low-power BS 104 is in a coverage area of the macro BS 102. In another example, the low-power BS 104 may be outside the coverage area of the macro BS 102, but the coverage areas of the low-power BS 104 and the macro BS 102 are partly overlapped.

As shown in FIG. 1, the UE 100 is in coverage areas of the macro cell BS 102 and the low-power BS 104. The UE 100 can communicate with the macro cell BS 102 and the low-power BS 104 at the same time. That is, the communication device 104 can performs a transmission/reception via both a cell of the macro cell BS 102 and a cell of the low-power BS 102. The UE 100 can be a machine type communication (MTC) device, a mobile phone, a laptop, a tablet computer, an electronic book or a portable computer system. In addition, the macro cell BS 102/the low-power BS 104 and the UE 100 can be seen as a transmitter or a receiver according to direction, e.g., for an uplink (UL), the UE 100 is the transmitter and the macro cell BS 102/the low-power BS 104 is the receiver, and for a downlink (DL), the macro cell BS 102/the low-power BS 104 is the transmitter and the UE 100 is the receiver.

Figure 2:
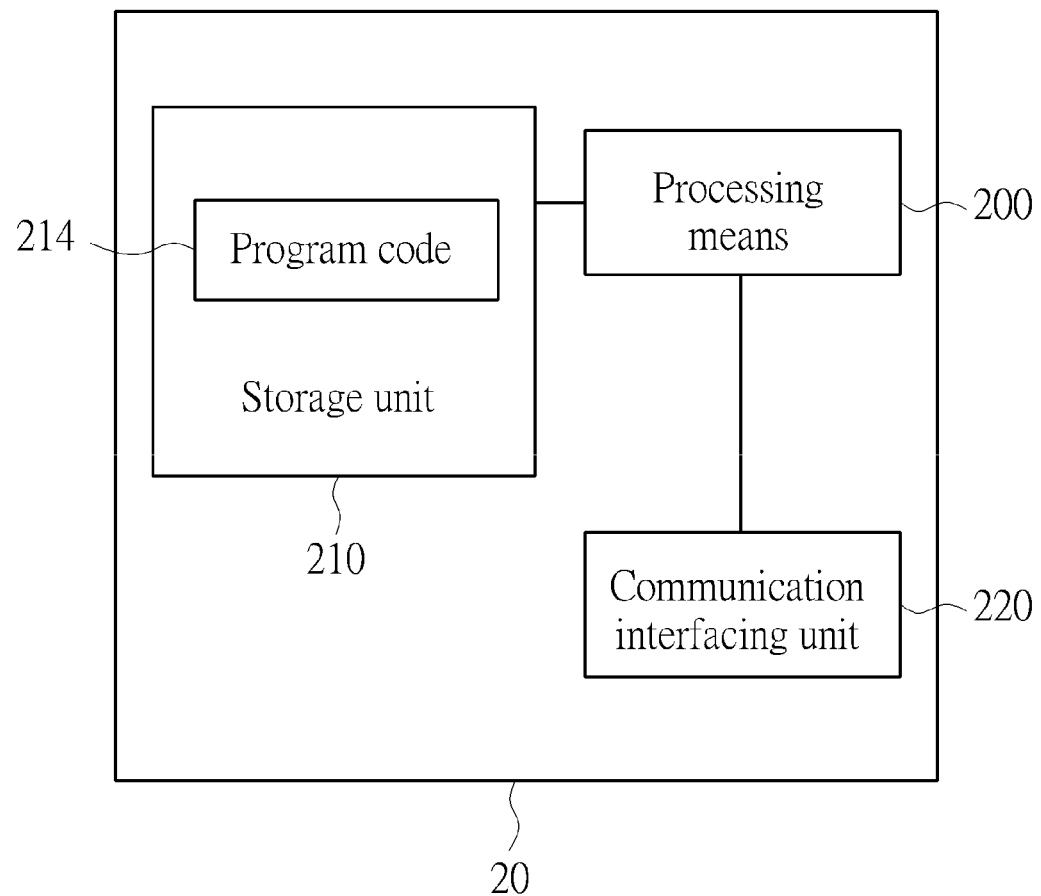
FIG. 2 is a schematic diagram of a communication device according to an example of the present invention.

Please refer to FIG. 2, which is a schematic diagram of a communication device 20 according to an example of the present invention. The communication device 20 can be the UE 100, the macro cell BS 102 and/or the low-power BS 104 shown in FIG. 1, but is not limited herein. The communication device 20 may include a processing means 200 such as a microprocessor or Application Specific Integrated Circuit (ASIC), a storage unit 210 and a communication interfacing unit 220. The storage unit 210 may be any data storage device that can store a program code 214, accessed and executed by the processing means 200. Examples of the storage unit 210 include but are not limited to a subscriber identity module (SIM), read-only memory (ROM), flash memory, random-access memory (RAM), CD-ROM/DVD-ROM, magnetic tape, hard disk and optical data storage device. The communication interfacing unit 220 is preferably a transceiver and is used to transmit and receive signals (e.g., data, signals, messages and/or packets) according to processing results of the processing means 200.

Figure 3:
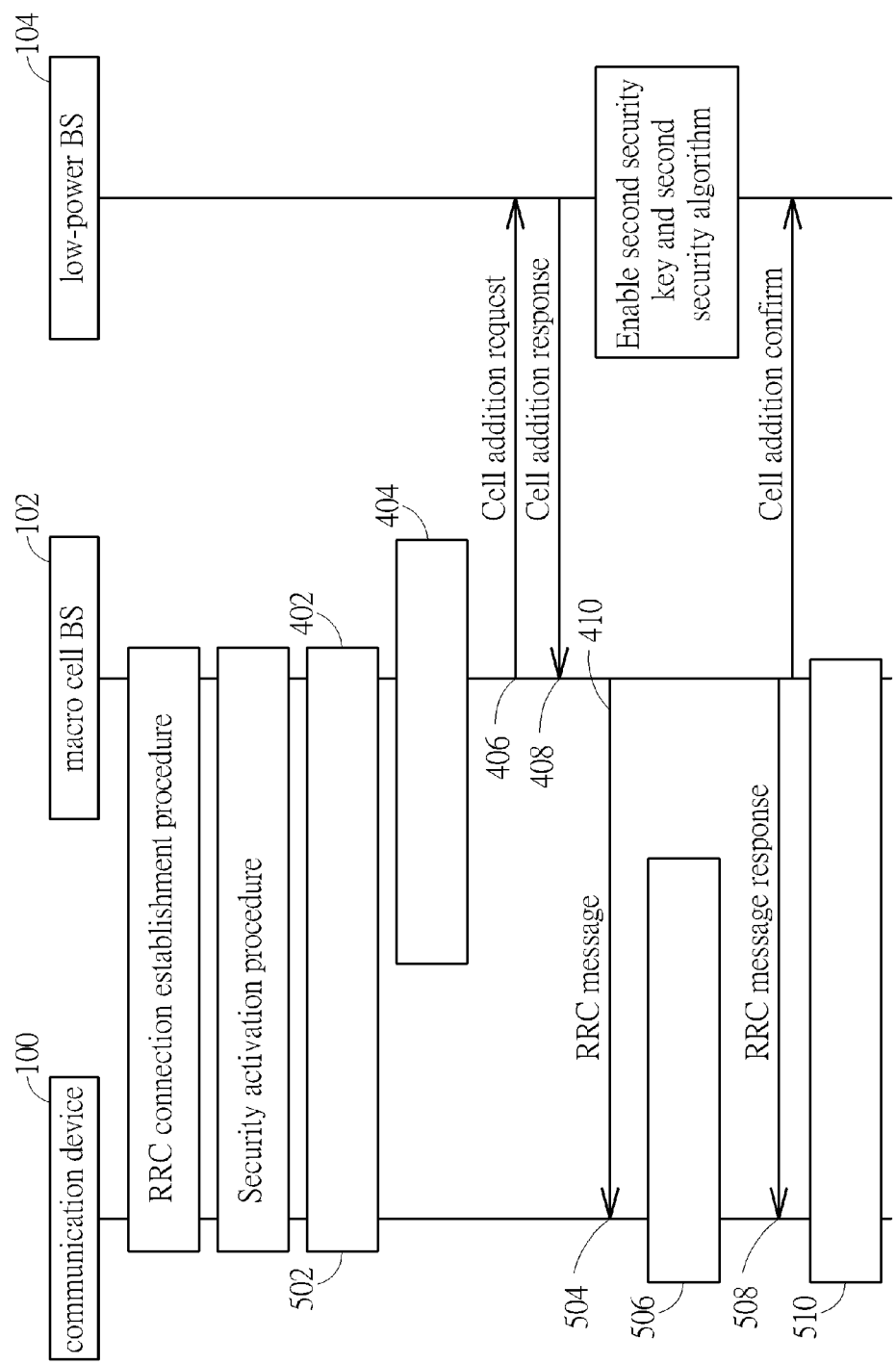
FIGS. 3-10 are flowcharts of processes according to examples of the present invention.

FIG. 3 is a diagram illustrating communications of the wireless communication system 10 according to an example of the present invention. FIG. 3 presents a process 40 utilized in the macro cell BS 102 and a process 50 utilized in the UE 100, and also a process in view of the lower-power BS 104. The detail descriptions of the process 40 and the process 50 are given in FIG. 4 and FIG. 5.

As shown in FIG. 3, the UE 100 and the macro cell BS 102 perform an RRC connection establishment procedure so that the UE 100 and the macro cell BS 102 can communicate with each other. And, the UE 100 and the macro cell BS 102 may perform a security activation procedure and the UE is able to obtain a first security key and a first security algorithm during the security activation procedure, so that transmissions and/or receptions (step 402 and step 502) between the UE 100 and the cell of the macro cell BS 102 can be protected by the use of the first security key and the first security algorithm. The first security key and the first security algorithm are enabled (i.e., applied) at both the UE 100 and the macro cell BS 102.

Then, the macro cell BS 102 determines to allocate a cell of the low-power BS 104 to the UE 100 (step 404). The method the macro cell BS 102 uses to determine/select a cell of the low-power BS 104 is not limited. For example, the macro cell BS 102 may determine the cell of the low-power BS 104 according to a measurement result transmitted by the UE 100. In another example, the macro cell BS 102 may determine the cell of the low-power BS 104 according to a request transmitted by the UE 100, wherein the request indicates the cell of the low-power BS 104.

The macro cell BS 102 transmits a cell addition request message to the low-power BS 104 (Step 406), for requesting the low-power BS 104 to allocate radio resources of the cell of the low-power BS 104 to the UE 100 to communicate with the cell of the low-power BS 104. The cell addition request message may or may not include information related to a second security key and/or information related to a second security algorithm, which are described in detail later. The second security key and the second security algorithm are enabled at both the UE 100 and the low-power BS 104 so transmissions and receptions can be protected.

The low-power BS 104 may obtain the second security key and the second security algorithm based in the received information related to a second security key and/or information related to a second security algorithm, whatever they are included in the cell addition request message or any other additional message. Then, the low-power BS 104 may transmit a cell addition response message to the macro cell BS (step 408), in response to the cell addition request message. Depend on which base station generates the second security key and the second security algorithm, the cell addition response may or may not include the second security key and the second security algorithm, which is also given in detail later.

It should be noted that the first security key and the second security key may be the same or different, and the first security algorithm and the second security algorithm may be the same or different. If the first security key and the second security key are the same, it will simplify implementation of security function for UEs and base stations. However, this increases security risk. On the other hand, if the first security key and the second security key are the different, it might increase a little bit complexity in implementation of the security function in the UEs and base stations due to two different security keys but obviously decreases the security risk.

Then, the macro cell BS 102 transmits a RRC message to the UE 100 (step 410 and step 504), wherein the RRC message includes information related to the second security key and may also include information related to the second security algorithm. The UE 100 obtains the second security key and the second security algorithm (step 506) according to the information included in the RRC message then enables the second security key and the second security algorithm. If the RRC message does not include or have the information related to security algorithm, which implies the second security algorithm (for the UE and the low-power BS) is same as the first security algorithm (for the UE and the macro cell BS).

The UE 100 may transmit an RRC response message (e.g., RRCConnectionReconfigurationComplete) to the macro cell BS 102 (step 508) in response to the received RRC message and perform data transmission and/or reception (step 510). On the other side, the macro cell BS 102 may transmit a cell addition confirm message to the low-power BS 104 after receiving the RRC response message. Alternatively, the UE 100 may transmit the RRC response message to the macro cell BS 102 in response to the received RRC message, and the macro cell BS 102 just forwards the RRC response message to the low-power BS 104 so that the low-power BS 104 may transmit a cell addition confirm message to the macro cell BS 102. Alternatively, the UE 100 does not transmit the RRC response message to the macro cell BS 102 but directly transmits the RRC response message to the low-power BS 104 via the cell of the low-power BS 104 (as shown in the dashed line message in FIG. 3); in this situation, the low-power BS 104 may transmit a cell addition confirm message to the macro cell BS 102 (as shown in the dashed line message in FIG. 3) after receiving the RRC response message from the UE 100.

It should be noted that, if the RRC response message is transmitted to the macro cell BS 102, the RRC response message may be protected by using the first security key and the first security algorithm (e.g., encrypted with the first security key and the first security algorithm); and if the RRC response message is transmitted to the low-power BS 104, the RRC response message may be protected by using the second security key and the second security algorithm (e.g., encrypted with the second security key and the second security algorithm.

Please note that, after the low-power BS 104 obtains the second security key and the second security algorithm, the low-power BS 104 may enable the second security key and the second security algorithm soon (or at any proper timing); otherwise, the low-power BS 104 does not apply the second security key and the second security algorithm until the low-power BS 104 receives a cell addition confirm message form the macro cell BS 102 or directly receives an RRC response message from the UE 100.

By the flows illustrated in FIG. 3, transmissions and/or receptions between the user equipment 100 and the cell of the low-power BS 104 can be protected by using the second security key and the second security algorithm. As a result, the UE 100 can communicate with both the cell of the macro cell BS 102 and the cell of the low-power BS 104 with protections determined to corresponding security keys and security algorithms. The steps and the messages in FIG. 3 demonstrate the concept of the invention, and detail of the steps in FIG. 5 may be slightly different based on requirement of practical implementations. Those skilled in the art can readily recognize the difference, and make combinations, modifications and/or alterations to the steps in the corresponding figures according to the difference.

The detailed flow for the process 40 and the process 50 are as follows.

Figure 4:
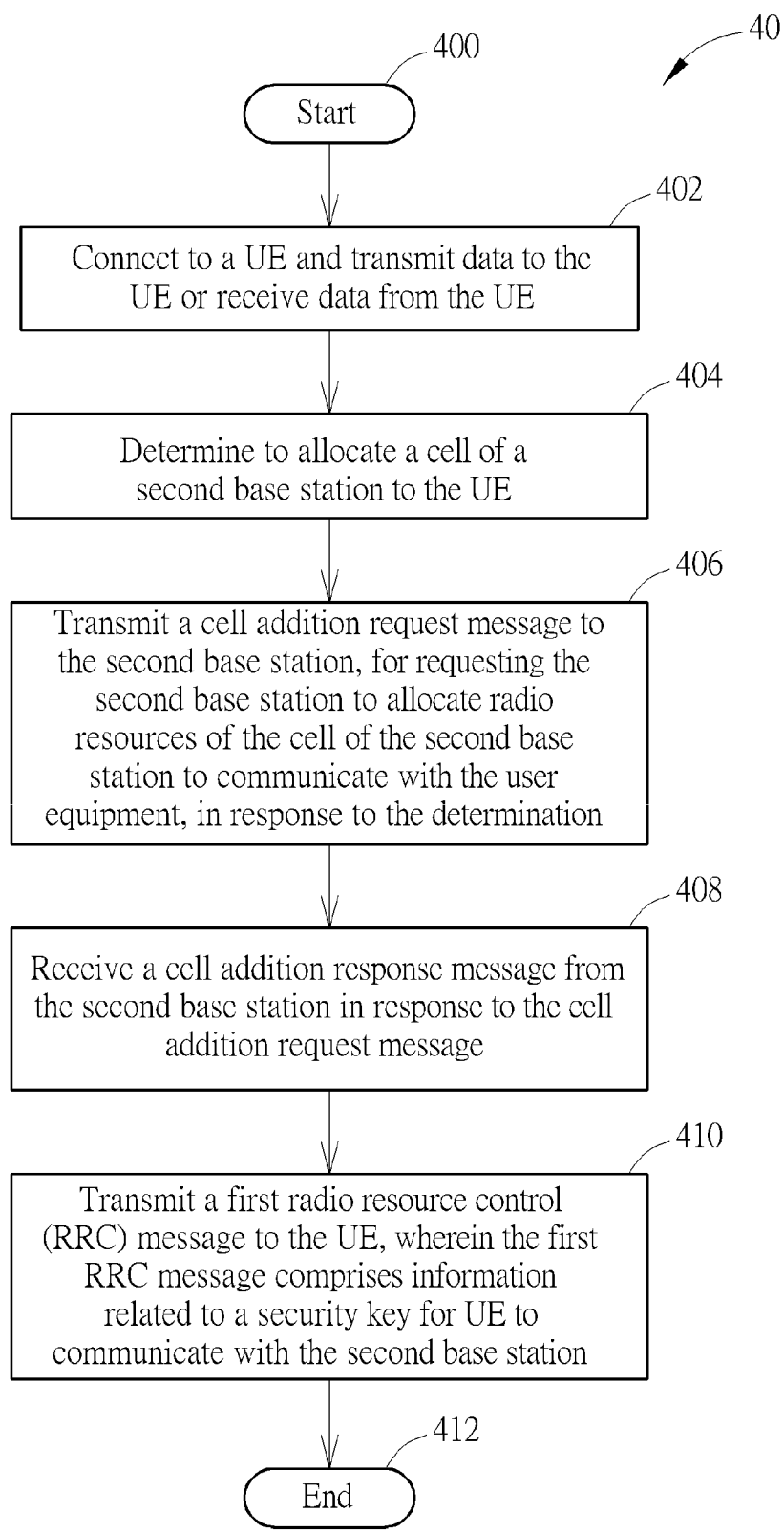

FIG. 4 is a flowchart of a process 40 according to an example of the present invention. The process 40 can be utilized in the communication device 20 which can be a first cell BS (e.g., the macro cell BS 102 in FIG. 1), for handling addition of cell of a second BS (e.g., the low-power BS 104 in FIG. 1). The process 40 may be compiled into the program code 214 and includes the following steps:

Step 400: Start.

Step 402: Connect to a UE and transmit data to the UE or receive data from the UE.

Step 404: Determine to allocate a cell of a second base station to the UE.

Step 406: Transmit a cell addition request message to the second base station in response to the determination, for requesting the second base station to allocate radio resources of the cell of the second base station to communicate with the user equipment.

Step 408: Receive a cell addition response message from the second base station in response to the cell addition request message.

Step 410: Transmit a first radio resource control (RRC) message to the UE, wherein the first RRC message comprises information related to a security key for UE to communicate with the second base station.

Step 412: End.

According to the process 40, the first BS (e.g., the macro cell BS 102) determines (e.g., selects) to allocate a cell of a second BS (e.g., the low-power BS 104) to the UE which has connected the first BS (Step 404), and the first BS transmits a cell addition request message to the second BS, for requesting the second BS to allocate radio resources of the cell of the second base station to communicate with the UE (Step 406).

The cell addition request message may include information related to a second security key which is used for the second BS to communicate with the UE. The second security key is used for security purpose such as encryption/decryption or integrity protection/check for the communication between the second BS and the UE. Please note that information related to the second security key is the second security key itself or information for deriving the second security key, or any other similar information not limited herein. The information for deriving the second security key can be a value used to derive the second security key according to a key derivation function. In other words, the first BS may generate the second security key and put the second security key into the cell addition request message (and transmit to the second BS) so that the second BS use the second security key directly for communicating with the UE; otherwise, the first BS may put the information for deriving the second secure key into the cell addition request message and the second BS generates the second security key for communicating with the UE by the second BS itself, according to the received information related to the second security key.

Please note that the first BS (as the macro base station) and the UE use a first security and a first security algorithm when they are communicating with each other for the security purpose, which is the same as they did in the prior art when low-power base stations are not introduced the LTE system and is therefore omitted.

Furthermore, the cell addition request message may include information identifying the cell of the second BS to know which cell the first BS requests to allocate for the UE. The cell addition request message may include information related to a second security algorithm (which is decided by the first BS) for the second BS to communicate with the UE, or include information related to all the security algorithms the first BS can provide and security capability information of the UE (e.g., security algorithm supported by the UE).

Alternatively, the first BS may transmit a cell addition request message not including the information related to the second security key. In this embodiment, the first BS may transmit another message including the information related to second security key to the second BS additionally, after transmitting the cell addition request message. The information related to security key can be either the second security key generated by the first BS or the information for deriving the second security key (which can be a value used to derive the second security key according to a key derivation function) so that the second BS can generate the second security key accordingly.

After the cell addition request message is transmitted, the first BS receives a cell addition response message (Step 408), in response to the cell addition request message from the second base station. Since the second security key may be generated by the second BS or by the first BS itself, the cell addition response message may or may not include information related to the second security key. That is, when the second security key is generated by the second BS (whatever it is generated based on the related information included in the cell addition request message or in the additional message), the first BS may receive the cell addition response message including information related to the second security key.

Furthermore, the cell addition response message may (or may not) include information related to the second security algorithm selected by the second BS according to the security capability of the UE included in the cell addition request message, which depends on who decides second security algorithm that the second BS uses. When the first BS decides and transmits the second security algorithm to the second BS, the second BS can use the second security algorithm directly and does not need to generate or derive the second security algorithm by itself and thus the cell addition response message received from the second BS does not include the second security algorithm. On the other hand, when the first BS puts information related to all the security algorithms the first BS can provide and security capability information of the UE (e.g., security algorithm supported by the UE) into the cell addition request message, which means the decision of the second security algorithm is left to the second BS, the cell addition response message is supposed to include information related to the second security algorithm decided by the second BS.

The first BS transmits a first radio resource control (RRC) message (e.g. RRCConnectionReconfiguration) to the UE (Step 410), wherein the first RRC message includes information related to the second security key for the UE to communicate with the second BS. As the mentioned previously, the second security key is used for security purpose such as encryption/decryption or integrity protection/check for the communication between the second BS and the UE. Also, the information related to the second security key transmitted to the UE is the second security key itself or information for deriving the second security key, or any similar information which is not limited herein. Information for deriving the second security key can be a value used to derive the second security key according to a key derivation function In addition, the first RRC message may further include information related to the second security algorithm. The second security algorithm may include an encryption/decryption algorithm for encryption/decryption and/or an integrity protection algorithm for integrity protection/check. The second security algorithm is either decided by the second BS (according to the security capability of the UE) and included in the cell addition response message as described above, or generated by the first BS itself according to the security capability of the UE. The information related to the second security algorithm may include information needed for obtaining (e.g., identifying) the second security algorithm, such as an indicator indicating the security algorithm, and is not limited herein. If the information related to second security algorithm is not included in the first RRC message or not defined in format of the first RRC message, the first security algorithm used for transmissions and/or receptions between the UE and the first BS will be used for transmissions and/or receptions between the UE and the second BS, i.e., the UE uses the first security algorithm instead for communicating with the second BS.

Then, the UE transmits a RRC response message to the first BS via a cell of the first BS or to the second BS via a cell of the second BS. Thus, transmissions and/or receptions performed between the UE and the cell of the second BS can be protected (e.g., encrypted or integrity protected) according to the second security key and the security algorithm (or the first security key and security algorithm, at least).

In addition, the first RRC message may include cell information including at least one of band information, carrier frequency, physical cell identify and cell identity of the cell of the second BS.

Realization of the present invention is not limited to the above description. In the following, examples are described according to the wireless communication system 10.

Figure 5:
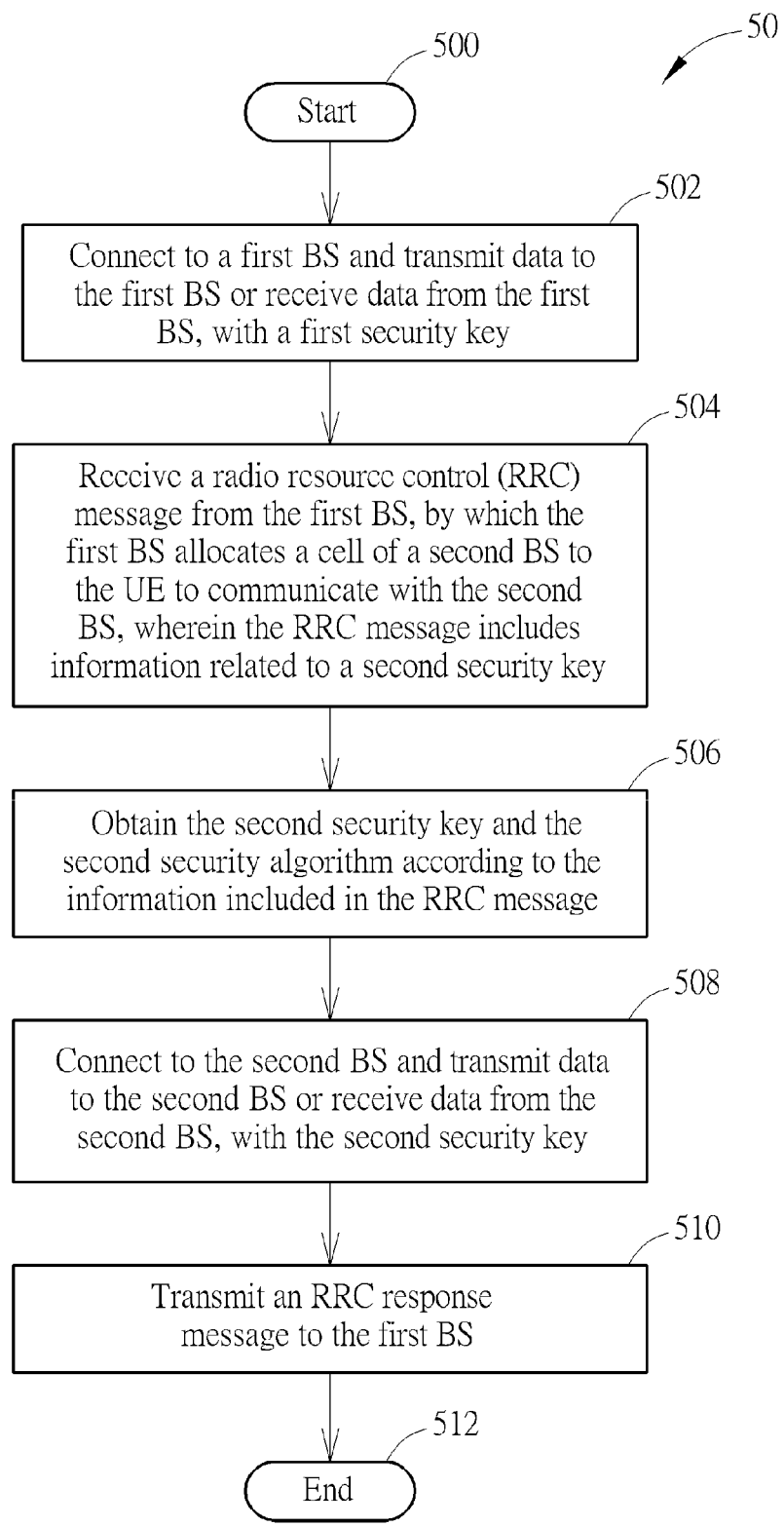

FIG. 5 is a flowchart of a process 50 according to an example of the present invention. The process 50 can be utilized in a communication device 20 which can be the UE 100 shown in FIG. 1, for handling cell addition of a second BS (e.g., the low-power BS 104) for UE 100. The process 50 may be compiled into the program code 214 and includes the following steps:

Step 500: Start.

Step 502: Connect to a first BS and transmit data to the first BS or receive data from the first BS, with a first security key.

Step 504: Receive a radio resource control (RRC) message from the first BS, by which the first BS allocates a cell of a second BS to the UE to communicate with the second BS, wherein the RRC message includes information related to a second security key.

Step 506: Obtain the second security key and the second security algorithm according to the information included in the RRC message.

Step 508: Connect to the second BS and transmit data to the second BS or receive data from the second BS, with the second security key.

Step 510: Transmit an RRC response message to the first BS.

Step 512: End.

The detail of the process 50 can be realized from the above descriptions related to FIG. 3 and FIG. 4, which is omitted herein.

Figure 6:
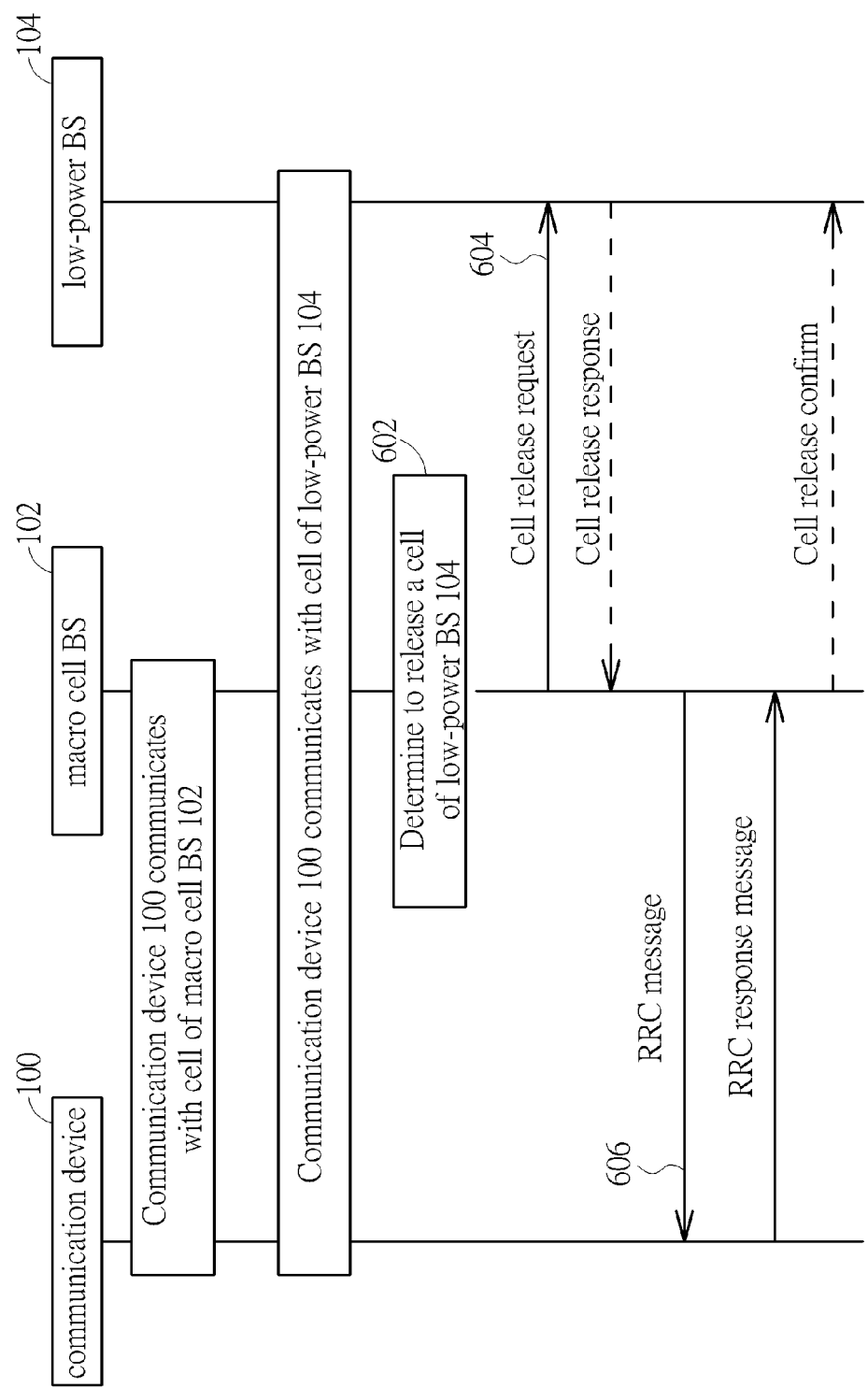

FIG. 6 is a diagram illustrating communications of the wireless communication system 10 according to an example of the present invention. FIG. 6 presents a process 60 utilized in the communication device 20 which can be the macro cell BS 102 shown in FIG. 1, for handling release of a cell of a second BS (e.g., the low-power BS 104). The process 60 may be compiled into the program code 214 and includes the following steps:

Step 600: Start.

Step 602: Determine to release a cell of a second base station from the UE.

Step 604: Transmit a cell release request message to the second base station, for initiating the release of the cell of the second base station.

Step 606: Transmit a RRC message to the UE to indicate the UE to release the cell of the second base station.

Step 608: End.

Note that the UE 100 has communicated with both of a cell of the macro cell BS 102 and a cell of the low-power BS 104 before the cell of the low-power BS 104 is released. According to the process 60 shown in FIG. 6, the first BS determines (e.g., selects) a cell of a second BS (e.g., the low-power BS 104) which communicates with the UE (step 602) and initiate the release of the cell of the second BS for the UE by transmitting a cell release message to the second BS (step 604). Then, the first BS transmits a RRC message to the communication device (step 606), to indicate the UE to release the cell of the second BS. After receiving the cell release request message, the second BS releases the cell, i.e. stopping allocating radio resources to the communication device. In another example, the second BS may transmit a cell release response message (as shown in dash line) to the first BS in response to the cell release request message.

When the first BS receives the release response message, the first BS transmits a RRC message (e.g. RRCConnectionReconfiguration) indicating the release of the cell of the second BS, to the UE. When the UE receives the RRC message, the UE releases the cell of the second BS. The UE stops receiving control signaling and/or data from the cell of the second BS. Furthermore, the UE may transmit a RRC response message (e.g. RRCConnectionReconfiguration-Complete) to the first BS via a cell of the first BS. After the first BS receives the RRC response message, the first BS may (or may not) transmit a cell release confirm message to the second BS, to confirm the cell release procedure is done. Note that, instead of releasing the cell of the second BS after receiving the cell release request, the second BS may release the cell after receiving the cell release confirm message. Thus, the cell of the second BS can be released according to the above description.

Realization of the present invention is not limited to the above description. In the following, examples are described according to the wireless communication system 10.

Figure 7:
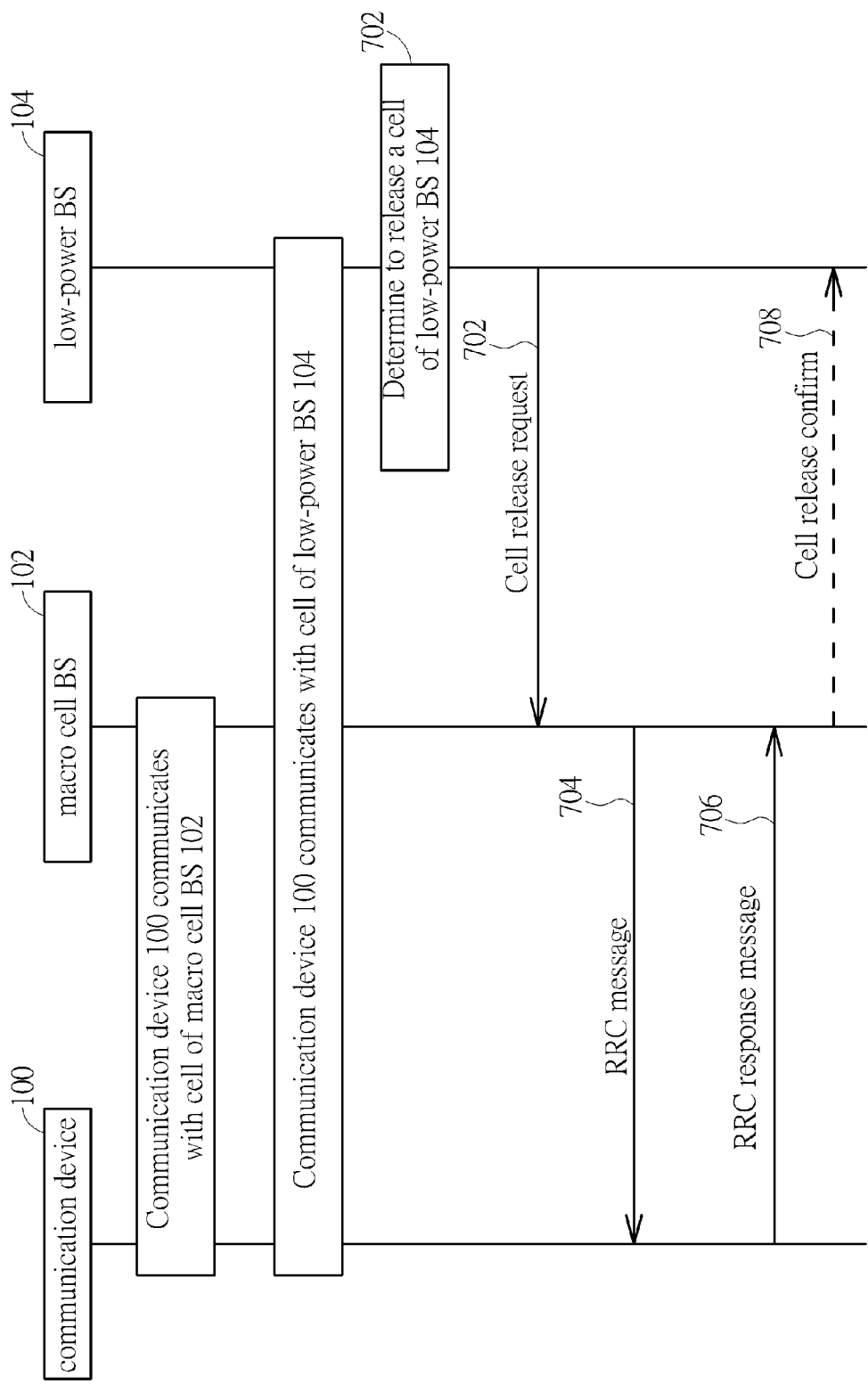

FIG. 7 is a diagram illustrating communications of the wireless communication system 10 according to an example of the present invention. Similar to FIG. 6, FIG. 7 presents a process 70 utilized in a communication device 20 which can be the macro cell BS 102. Also, in FIG. 7, the UE 100 has communicated with both of a cell of the macro cell BS 102 and a cell of the low-power BS 104 before the cell of the low-power BS 104 is released. Different from FIG. 6, in FIG. 7 the low-power BS 104 initiates the release of its cell from the UE 100 by transmitting a cell release request message to the macro cell BS 102 (step 702). The macro cell BS 102 then transmits a RRC message to the UE 100 (via the cell of the macro cell BS 102) to release the cell of the low-power BS 104 from the UE 100 (step 704), after receiving the cell release request message. The macro cell BS 102 may receive a RRC response message (via the cell of the macro cell BS 102) from the UE 100 (step 706) in response to the RRC message. The macro cell BS 102 may transmit a cell release confirm message to the low-power BS 104 (step 708) after receiving the RRC response message. Thus, the cell of the low-power BS 104 can be released. It is noted that the low-power BS may release the cell after it initiates the release process or after receiving the cell release confirm message.

Figure 8:
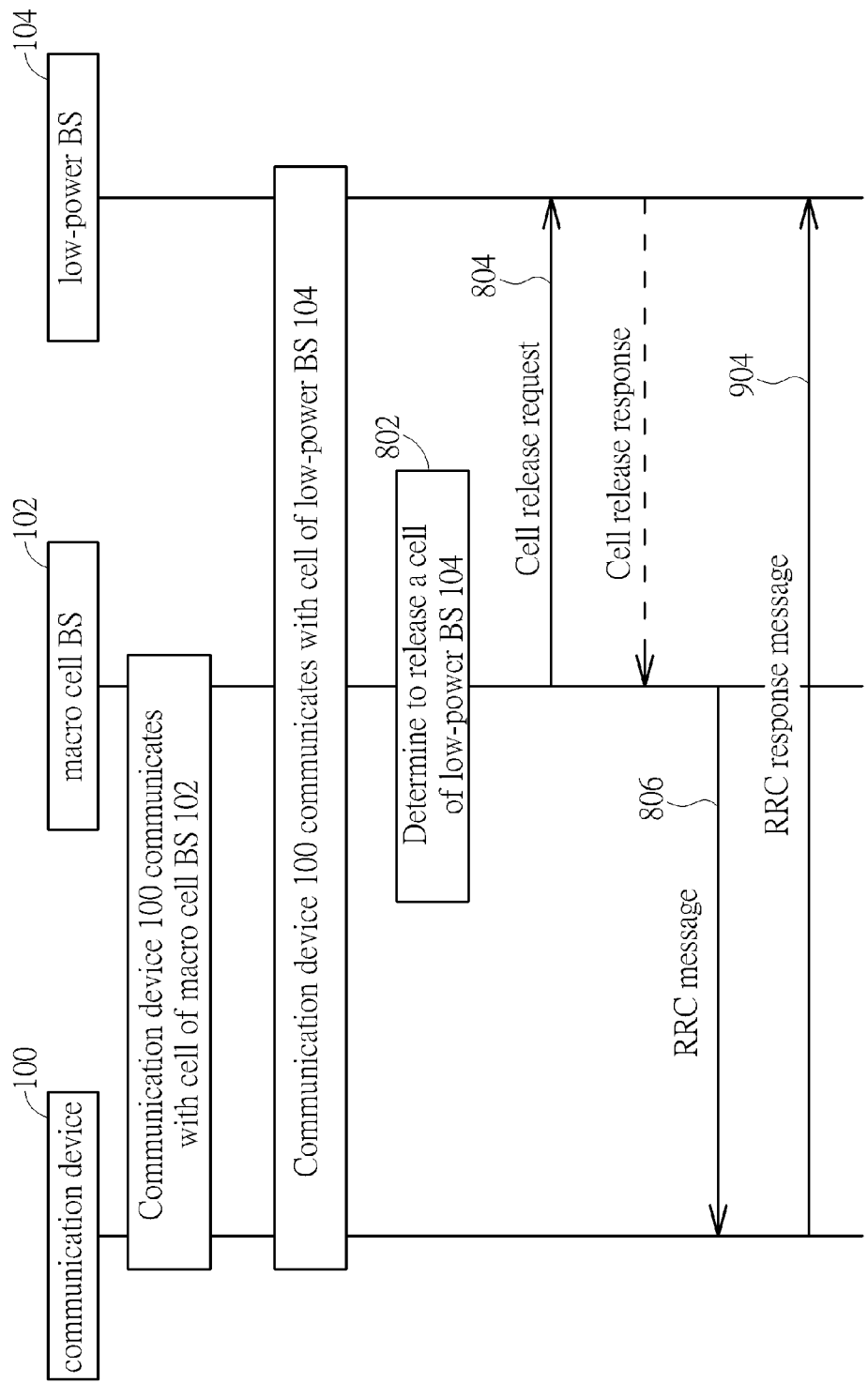

FIG. 8 is a diagram illustrating communications of the wireless communication system 10 according to an example of the present invention. In FIG. 8, the UE 100 has communicated with both of a cell of the macro cell BS 102 and a cell of the low-power BS 104 before the cell of the low-power BS 104 is released. The macro cell BS 102 determines (e.g., selects) a cell of the low-power BS 104 which communicates with the UE 100 and the macro cell BS 102 initiates the release of the cell of the low-power BS 104 for the UE 100. Similar to the former part of FIG. 6, Steps 802, 804 and 806 are the same as Steps 602, 604 and 606, and are omitted herein.

Different from FIG. 6, in FIG. 8 the UE 100 does not transmit a RRC response message to the macro cell BS 102 but transmits the RRC response message to the low-power BS 104 (via a cell of the first BS, the cell of the second BS or another cell of the second BS). If the UE 100 transmits the RRC response message via the cell of the second BS, the UE 100 releases the cell of the low-power BS 104 after transmitting the RRC response message. Note that, instead of releasing the cell of the second BS after receiving the cell release request, the lower-power BS 104 may release the cell after receiving the RRC response message from the UE 100

Figure 9:
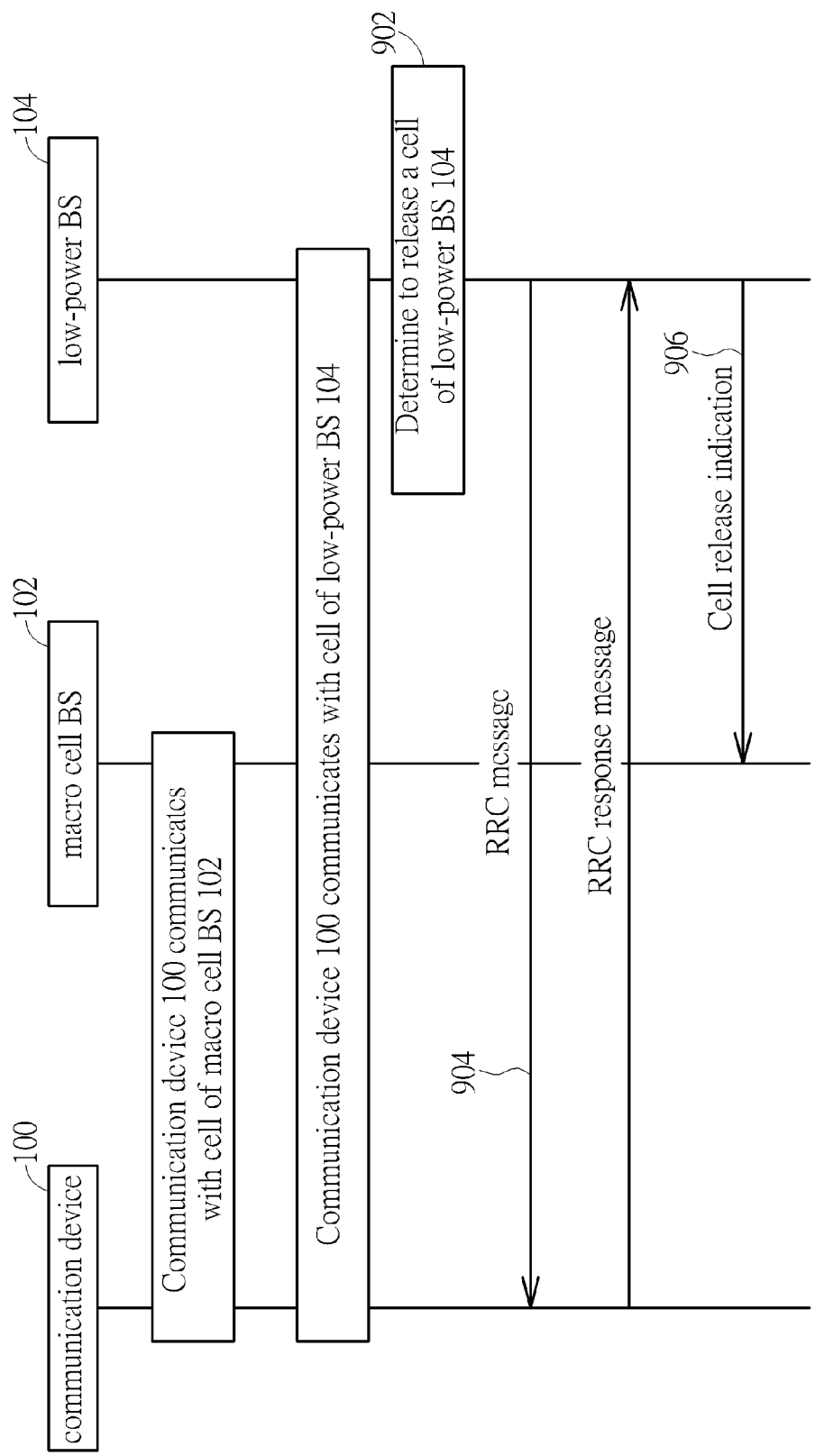

FIG. 9 is a diagram illustrating communications of the wireless communication system 10 according to an example of the present invention. FIG. 9 presents a process 90 utilized in the communication device 20 which can be the low-power BS 104 shown in FIG. 1, for handling a cell release of the low-power BS 104. The process 90 may be compiled into the program code 214 and includes the following steps:

Step 900: Start.

Step 902: Determine to release a cell of the second base station for a UE.

Step 904: Transmit a RRC message to the UE, to indicate the UE to release the cell of the second base station.

Step 906: Transmit a cell release confirm message to a first base station, for indicating the release of the cell of the second base station.

Step 908: End.

Note that the UE 100 has communicated with both of a cell of the macro cell BS 102 and a cell of the low-power BS 104 before the cell of the low-power BS 104 is released. According to the process 90, the low-power BS 104 determines to release a cell of the low-power BS 104 for a UE 100 (step 902), and transmits an RRC message to the UE 100 (step 904) to indicate the UE to release the cell of the low-power BS 104. Thus, the cell of the low-power BS 104 can be released. Furthermore, the low-power BS 104 transmits a cell release confirm message indicating that the cell of the low-power BS 104 is released to the macro cell BS 102 (step 906).

Realization of the present invention is not limited to the above description. In the following, examples are described according to the wireless communication system 10.

Figure 10:
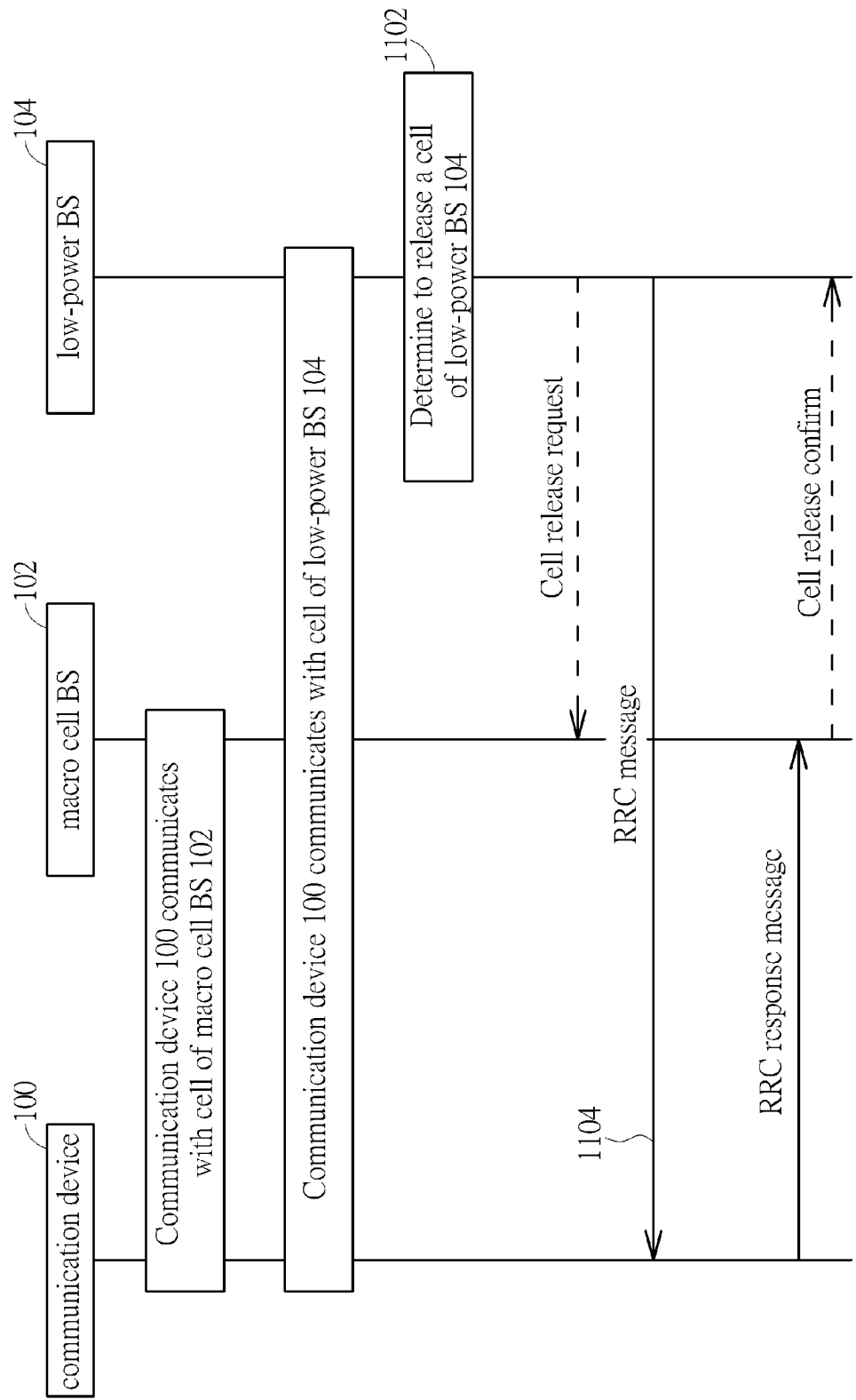

FIG. 10 is a diagram illustrating communications of the wireless communication system 10 according to an example of the present invention. FIG. 10 presents a process 110 utilized in the communication device 20 which can be the low-power BS 104 shown in FIG. 1, for handling a cell release of the low-power BS 104. The process 110 may be compiled into the program code 214 and includes the following steps:

Step 1100: Start.

Step 1102: Determine to release a cell of the second base station for a UE.

Step 1104: Transmit a cell release request message to a first BS, to indicate the UE to release the cell of the second BS.

Step 1106: End.

Note that the UE 100 has communicated with both of a cell of the macro cell BS 102 and a cell of the low-power BS 104 before the cell of the low-power BS 104 is released. According to the process 110, the low-power BS 104 determines to release a cell of the low-power BS 104 for a UE 100 (step 1102). The low-power BS 104 then transmits a cell release request message to the macro cell BS 102 (step 1104), to indicate the UE 100 to release the cell of the low-power BS 104. That is, the release procedure is initiated by the low-power BS 104. As shown in FIG. 10, the low-power BS 104 further transmits a RRC message to the UE 100 (via a cell of the macro cell BS 102, the cell of the low-power BS 104 or another cell of the low-power BS 104) to release the cell from the UE 100 (step 1104).

After the UE 100 receives the RRC message, the UE 100 may transmit an RRC response message to the macro cell BS102 (via a cell of the macro cell BS 102). If the cell release request message is transmitted at the beginning, the low-power BS 104 may receive a cell release confirm message transmitted by the macro cell BS 102 after the macro cell BS 102 receives the RRC response message. Thus, the cell of the low-power BS 104 can be released according to the above description.

It should be noted that a method according to which the macro cell BS 102 determines (e.g., selects) the cell of the low-power BS 104 to be released is not limited for addition. For example, the macro cell BS 102 may determine the release of the cell of the low-power BS 104 according to a measurement result transmitted by the UE 100. In another example, the macro cell BS 102 may determine the release of the cell of the low-power BS 104 according to a request transmitted by the UE 100, wherein the request indicates the cell of the low-power BS 104. the macro cell BS 102 may initiate release of the cell of the low-power BS 104 for the UE 100, after receiving a RRC message transmitted by the UE 100, wherein the RRC message indicates a security failure (e.g. integrity check failure) corresponding to the cell of the low-power BS 104.

In addition, the same steps (and the message therein) are used in different figures to demonstrate the concept of the steps (and the message therein). However, detail of the same steps (and the message therein) in different figures may be slightly different according to the practical implementation of the steps. Those skilled in the art should readily make combinations, modifications and/or alterations on the above-mentioned description and examples.

The abovementioned steps of the processes including suggested steps can be realized by means that could be a hardware, a firmware known as a combination of a hardware device and computer instructions and data that reside as read-only software on the hardware device, or an electronic system. Examples of hardware can include analog, digital and mixed circuits known as microcircuit, microchip, or silicon chip. Examples of the electronic system can include a system on chip (SOC), system in package (SiP), a computer on module (COM), and the communication device 20.

To sum up, the present invention provides a method of handling a security function for a macro cell BS. A security key and a security algorithm are indicated by the macro cell BS to a low-power BS according to the present invention. Thus, transmissions and/or receptions between a communication device and a cell of the low-power BS can be protected. In addition, the present invention provides a method of removing a cell of a low-power BS from a communication device. The removal process can be initiated by either the low-power BS or a macro cell BS. Thus, the cell can be removed properly without causing problems to communications between the communication device, the macro cell BS and the low-power BS.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A first base station for handling cell release for dual connectivity in a communication system comprising a user equipment (UE), the first base station and a second base station, wherein the UE has been connected to the first base station and the second base station, the first base station comprising:

a storage unit for storing instructions of:

determining to release a cell of the second base station which communicates with the UE;

transmitting a cell release request message to the second base station, for initiating a release of the cell of the second base station from the UE;

receiving a cell release response message transmitted by the second base station in response to the cell release request message;

transmitting a RRC message to the UE, to indicate the UE to release the cell of the second base station, after receiving the cell release response message; and receiving a RRC response message transmitted by the UE in response to the RRC message; and a processing circuit, coupled to the storage unit, configured to execute the instructions stored in the storage unit.

2. The first base station of claim 1, wherein the storage unit further stores an instruction of:

transmitting a cell release confirm message to the second base station, after receiving the RRC response message.

3. A first base station for handling cell release for dual connectivity in a communication system comprising a user equipment (UE), the first base station and a second base station, wherein the UE has been connected to the first base station and the second base station, the first base station comprising:

a storage unit for storing instructions of:

receiving a cell release request message from the second base station, for initiating a release of a cell of the second base station from the UE;

transmitting a RRC message to the UE, to indicate the UE to release the cell of the second base station in response to the cell release request message;

receiving a RRC response message transmitted by the UE in response to the RRC message; and transmitting a cell release confirm message to the second base station, after receiving the RRC response message; and a processing circuit, coupled to the storage unit, configured to execute the instructions stored in the storage unit.

4. A second base station for handling cell release for dual connectivity in a communication system comprising a user equipment (UE), a first base station and the second base station, wherein the UE has been connected to the first base station and the second base station, the second base station comprising:

a storage unit for storing instructions of:

deciding to release a cell of the second base station from the UE;

transmitting a cell release request message to the first base station, for initiating a release of the cell of the second base station from the UE; and receiving a cell release confirm message from the first base station, wherein the first base station transmits a RRC message to the UE, to indicate the UE to release the cell of the second base station in response to the cell release request message, and the first base station receives a RRC response message from the UE in response to the RRC message; and a processing circuit, coupled to the storage unit, configured to execute the instructions stored in the storage unit.

5. The second base station of claim 4, wherein the first base station transmits the cell release confirm message to the second base station, after receiving the RRC response message from the UE.

* * * * *